United States Patent [19]
Zeller et al.

[11] Patent Number: 6,062,909
[45] Date of Patent: May 16, 2000

[54] PLUG FOR GAS GENERATORS OF AIR BAG IMPACT PROTECTION SYSTEMS AND PROCESS FOR PRODUCING THE SAME

[75] Inventors: Gregor Zeller, Aschaffenburg; Helmut Bonn, Heibach, both of Germany

[73] Assignee: Petri AG, Germany

[21] Appl. No.: 09/264,658

[22] Filed: Mar. 8, 1999

Related U.S. Application Data

[63] Continuation of application No. 08/776,819, filed as application No. PCT/EP95/01932, May 22, 1995, abandoned.

[51] Int. Cl.[7] .................................................. H01R 13/66
[52] U.S. Cl. ................................................................ 439/620
[58] Field of Search ..................................... 439/620–622

[56] References Cited

U.S. PATENT DOCUMENTS

| | | |
|---|---|---|
| 4,109,992 | 8/1978 | Hughes . |
| 5,244,418 | 9/1993 | Gurley . |
| 5,310,362 | 5/1994 | Bauerle et al. .......................... 439/620 |

FOREIGN PATENT DOCUMENTS

| | | |
|---|---|---|
| 0600418 | 6/1994 | European Pat. Off. . |
| 2509856 | 9/1976 | Germany . |
| 3816024 | 12/1989 | Germany . |
| 4310369 | 10/1994 | Germany . |
| 2267188 | 11/1993 | United Kingdom . |

*Primary Examiner*—Gary F. Paumen
*Attorney, Agent, or Firm*—McGlew and Tuttle, P.C.

[57] ABSTRACT

A plug for gas generators of air bag impact protection systems has current paths formed by sheet metal strips and an inductance coil in one of both interrupted current paths that form two poles. One of the current paths is U-shaped; its branch opposite the counter-current path (4) is interrupted to form two inner poles (1, 2) and acts as a mechanical support for the inductance coil (5) that electrically bridges the interruption, and the other branch (3), located next to the counter-current path (4), forms together with the counter-current patch (4) plug pins (6, 7) that extend outwards. The plug pins (6, 7) are formed by bending the T-or forked-shaped ends of the current paths (3, 4). The inductance coil (5) is arranged in a housing and is provided with electric connections that can be directly connected to the inner poles (1, 2). In order to manufacture this plug, a preform is first cut out of a sheet metal web. The poles and current paths are repeated and held away from each other in the preform, then are embedded in a common substrate and the inductance coil (5) is mechanically and electrically connected to its support (1, 2).

7 Claims, 7 Drawing Sheets

PLUG FOR GAS GENERATORS OF AIR BAG IMPACT PROTECTION SYSTEMS AND PROCESS FOR PRODUCING THE SAME

This is a continuation of application Ser. No. 08/776,819 filed Jan. 21, 1997, now abandoned, which is a 371 of PCT/EP 95/01932 filed May 22, 1995 and the entire disclosure of this prior application is considered to be part of the disclosure of the accompanying application and is hereby incorporated by reference therein.

FIELD OF THE INVENTION

The present invention is based on a current conductor for plugs of an air bag inflator with a choke coil in the housing of the plug. The current conductors are formed from sheet metal strips.

BACKGROUND OF THE INVENTION

Plugs have hitherto been manufactured for this purpose in such a way that the contacts as well as the choke coil needed in the plugs are introduced in the housing. The housing is made, as a rule, of a plastic in a usual manner, and the inner and outer electrical connections to the connection lines are subsequently soldered. A separate chamber with openings toward the interior space of the plug is provided in the plug. The connection wires to be soldered are lead to the poles through these openings. The essential part of the necessary operations, especially of the soldering operations, is performed manually, which requires not only a considerable amount of work, but also a special skill in light of the small size of the parts.

SUMMARY AND OBJECTS OF THE INVENTION

The basic object of the present invention is to provide a current conductor for plugs of the above-described type, which can be manufactured in an extensively automated manner.

This object is accomplished with a current conductor having first and second current paths formed from a sheet metal strip. The first current path is U-shaped with an adjacent branch positioned adjacent the second current path and an opposite branch facing away from the second current path. The opposite branch includes two poles defining an interruption in the first current path. The adjacent branch and the second current path form plug pins. A choke coil is positioned in the first current path and electrically bridges over the interruption. The two poles form a mechanical support for the choke coil.

The present invention provides a plug for the above-described purpose, which can be manufactured in a fully automated manner, including the inner and outer electrical connections.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 2:
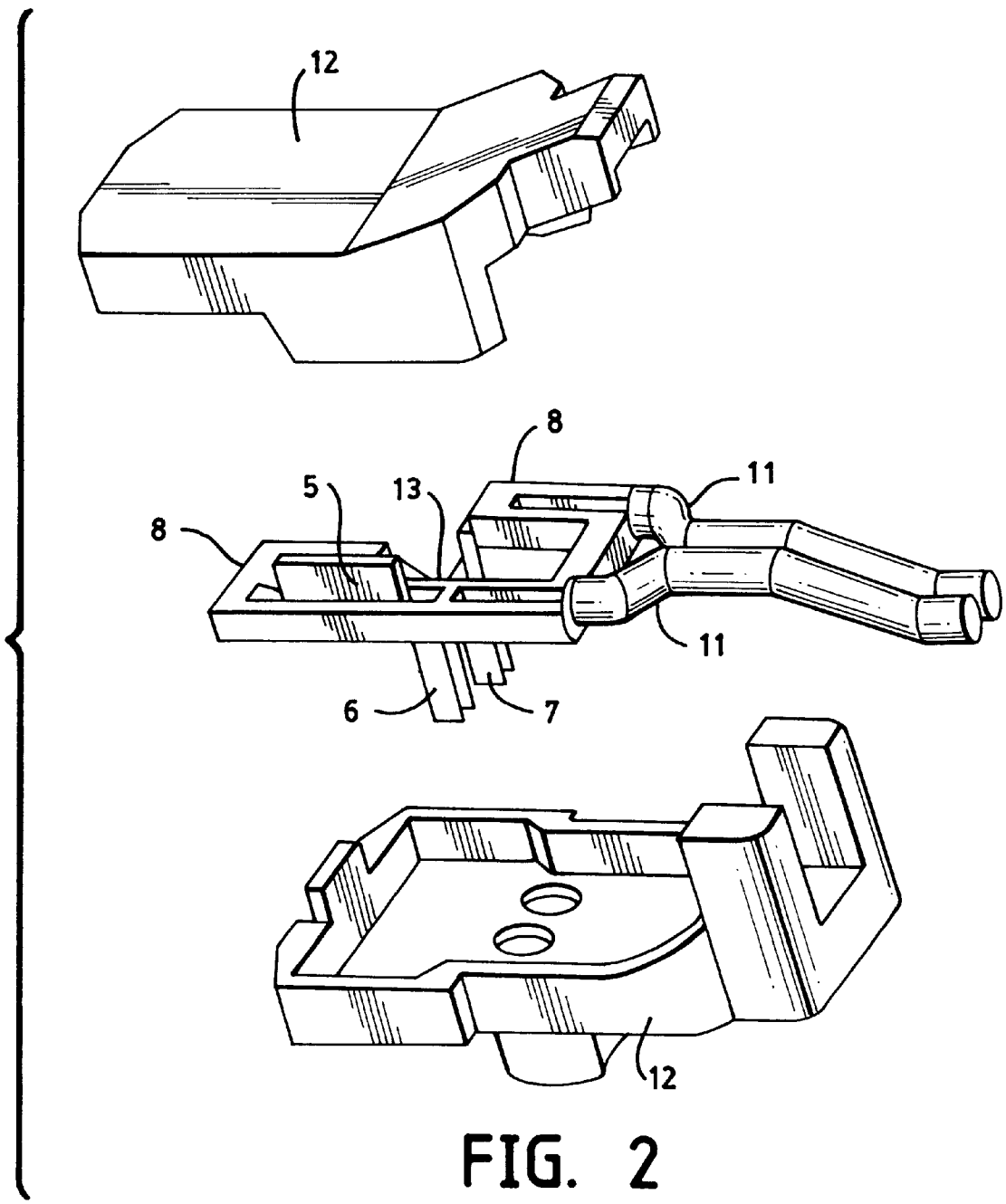
FIG. 2 is an exploded view of the plug.

The plug shown in the drawing, especially FIG. 2, is used to create the connection between a power source and the igniter for an inflator of an air bag impact protection device. The plug includes a housing 12 with top and bottom parts. Plug pins 6, 7 extend from a carrier 8 positioned between the top and bottom parts of the housing 12. Specifically, the plug pins 6, 7 extend though holes in the bottom part of the housing 12 for connection to the inflator of the air bag. A choke housing 5 is positioned in a slot 13 of the carrier 8. The choke housing 5 includes a choke coil for conditioning the current fed to the airbag inflator, and in FIG. 2, the choke coil directly effects the current feed to plug pin 6. Outer connection lines 11 lead to the carrier 8 and connect to current paths positioned in the carrier 8.

Figure 1:
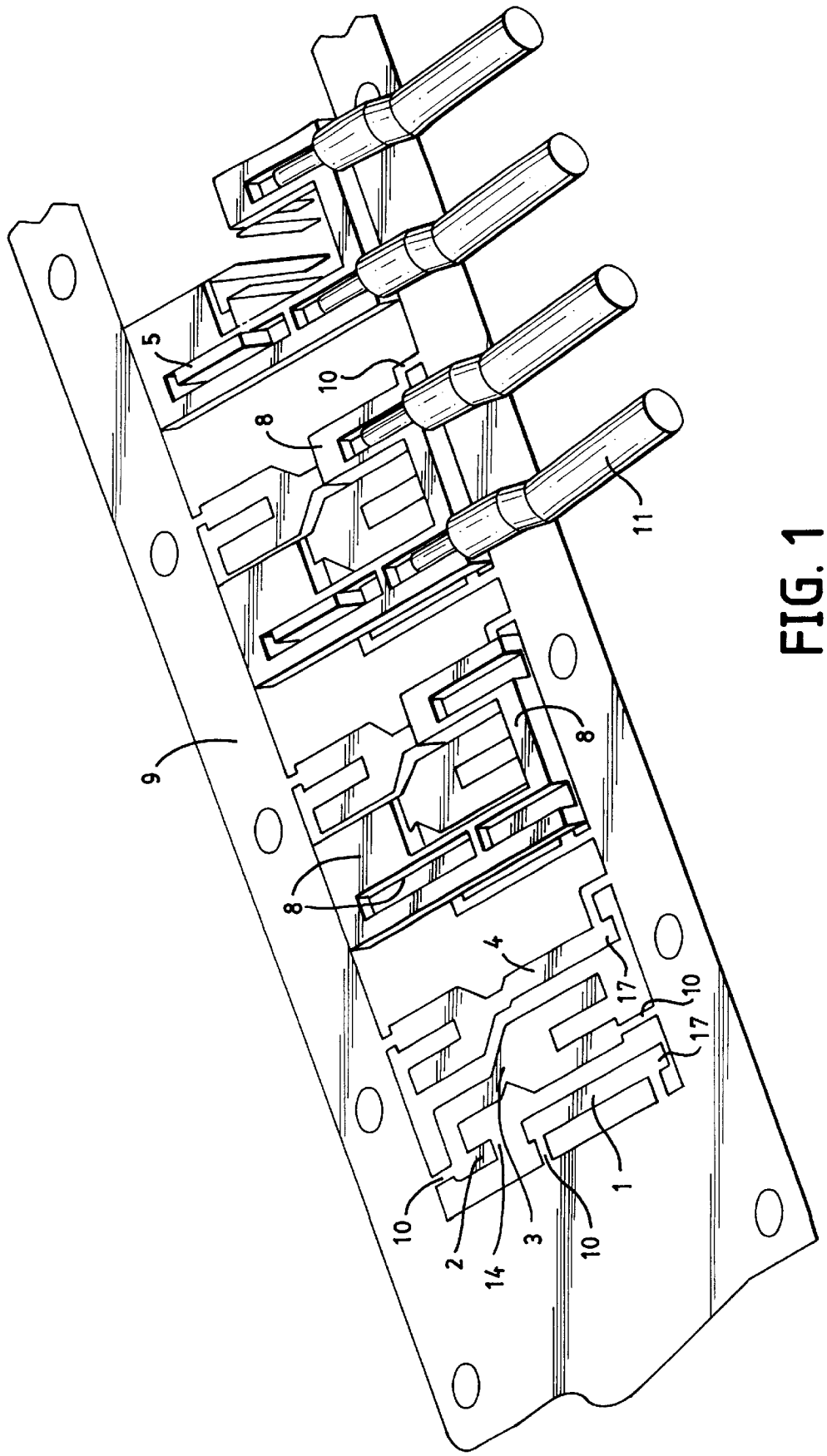
FIG. 1 is a schematic perspective view of the manufacturing process of the conductor for a plug.

Referring to FIG. 1, the current paths 1, 2, 3, 4 are designed as sheet metal strips. The plug is manufactured in such a way that a blank is made by punching out a periodically repeating pattern from a sheet metal strip 9, and the poles or current paths 1, 2, 3, 4 are held in the metal strip 9. FIG. 1 shows the sheet metal strip 9 with several different sets of current paths, and each set being in different stages of assembly. Current paths 1, 2, and 3 together with the choke coil in the choke housing 5 form the current path to plug pin 6. The choke housing 5 in its assembled state electrically bridges the gap 14 between individual current paths 1, 2. Current path 4 forms the current path to plug pin 7.

Figure 3:
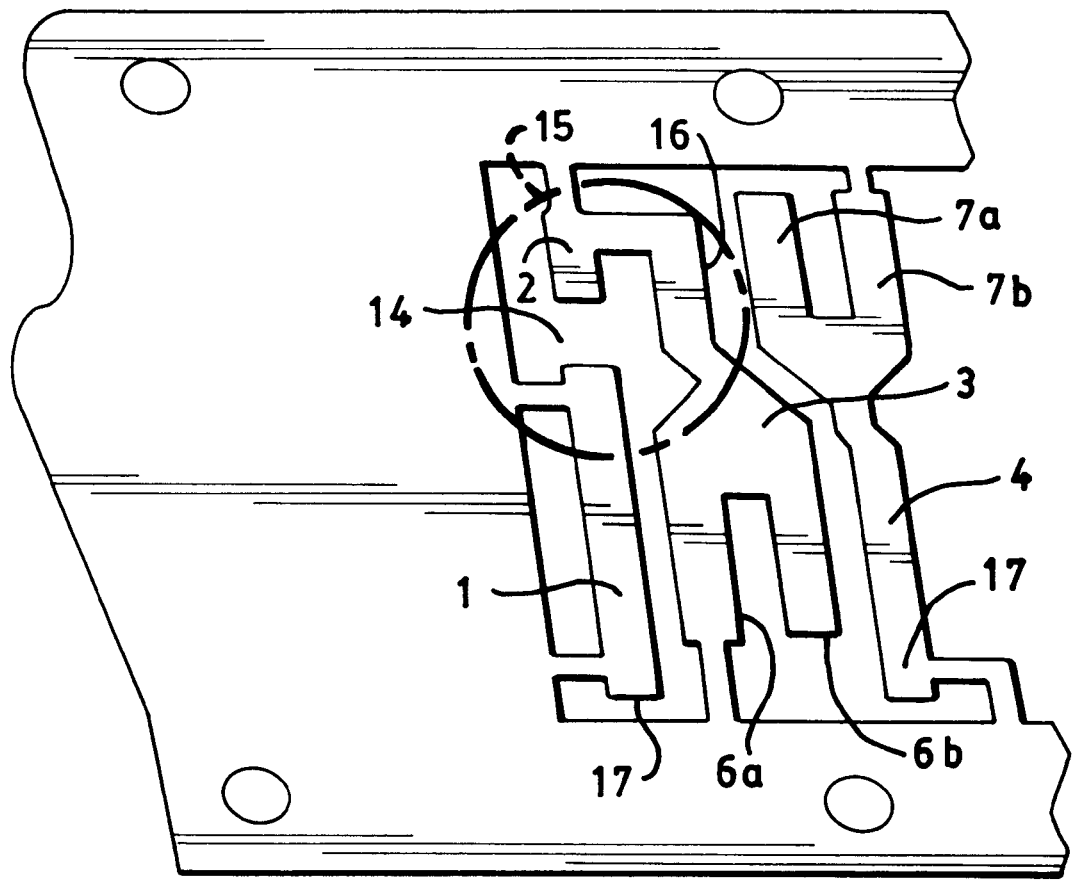
FIG. 3 is an enlarged view of the first step of the process of forming the plug.

As especially shown in FIG. 3 by reference numeral 15, current paths 1, 2 and 3 for plug pin 6 together form a U-shape, or actually an upside down U-shape according to the orientation of the Figures. The U-shape 15 has two legs or segments and a base, with the base being positioned toward the top in the Figures. One leg, or adjacent segment, 16 of the U-shape 15 is positioned adjacent the current path 4 and is part of current path 3. The other leg, or opposite segment, of the U-shape 15 is on the opposite side of, facing away from, the U-shape 15 from the current path 4 and includes parts of current paths 1 and 2, and gap 14. The current paths 1, 2 forming the opposite leg of the first current path is interrupted by the gap 14 to form inner poles and is used at the same time as a support for the choke housing 5. The choke housing 5 is provided with electrical terminals that can be directly connected to the current paths or poles 1, 2 which provide a mechanical support for the choke housing 5. The current path 3 includes forked shaped ends or portions 6a and 6b which are bent to form the plug pin 6. Likewise, current path 4 includes forked shaped ends or portions 7a and 7b which are bent to form the plug pin 7.

The current paths for each plug are formed by punching, in a first step emphasized in FIG. 3, in a periodically repeating manner in the sheet metal strip 9, such that the fork-shaped ends 6a, 6b and 7a, 7b are arranged complementary to each other and are orientated in opposite directions.

Figure 4:
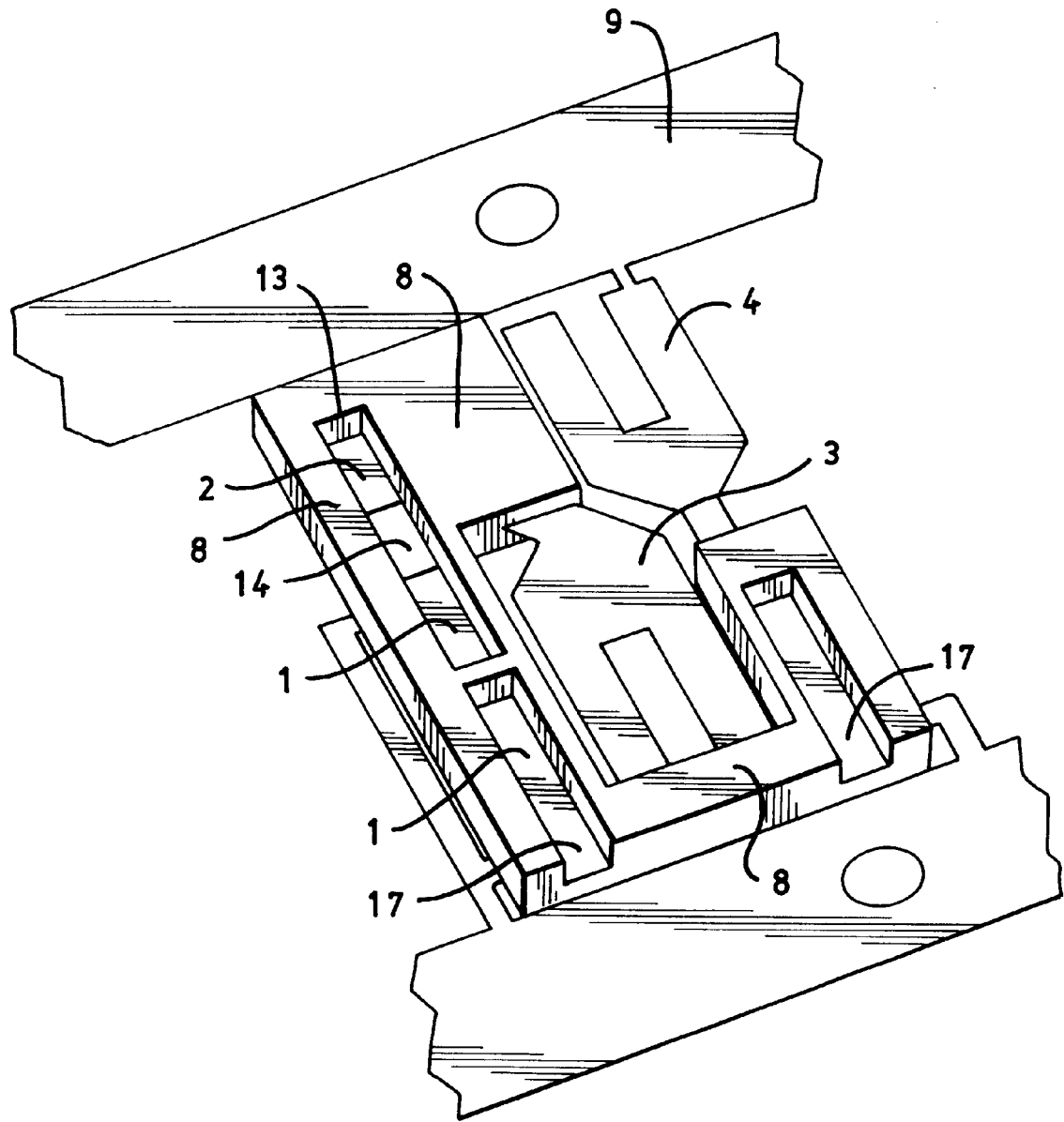
FIG. 4 is an enlarged view of the second step of the process of forming the plug.

After the punching, the strip is moved cyclically in a second step into an injection mold which follows the punching device. As shown by FIGS. 1 and 4, in the injection mold, the elements are embedded in the common support or carrier 8, leaving free the areas intended for the current connection.

Figure 5:
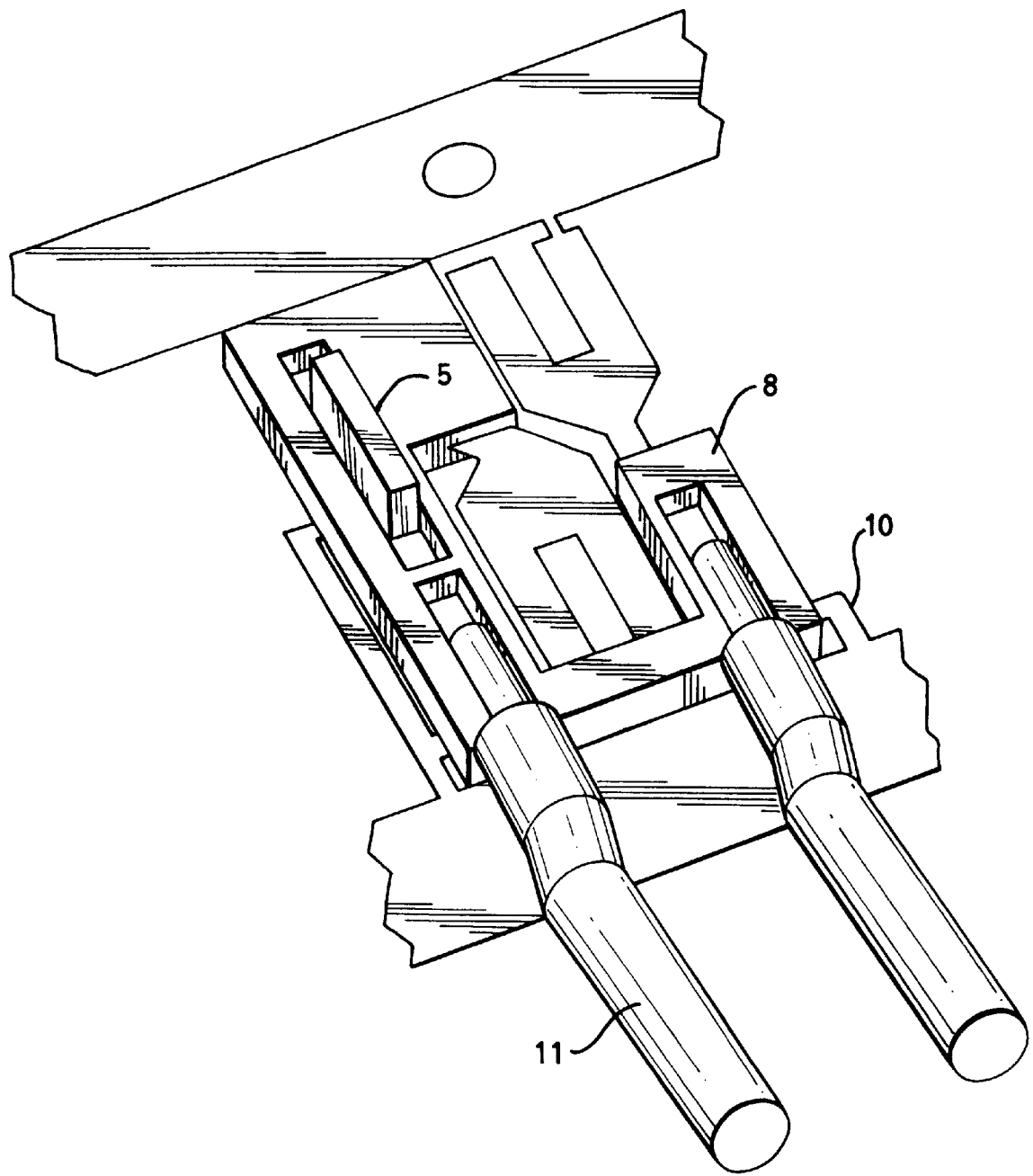
FIG. 5 is an enlarged view of the third step of the process of forming the plug.

The choke coil is prefabricated in the choke housing 5 with adapted supply terminals, not shown. After the embedding step, the third step shown in FIG. 5 includes inserting the choke housing 5 into the slot 13 to bridge the gap 14 and automatically soldering the terminals of the choke housing 5 to the current paths 1, 2. The outer connection lines 11 are also attached by soldering in this third manufacturing step to output ends 17.

Figure 6:
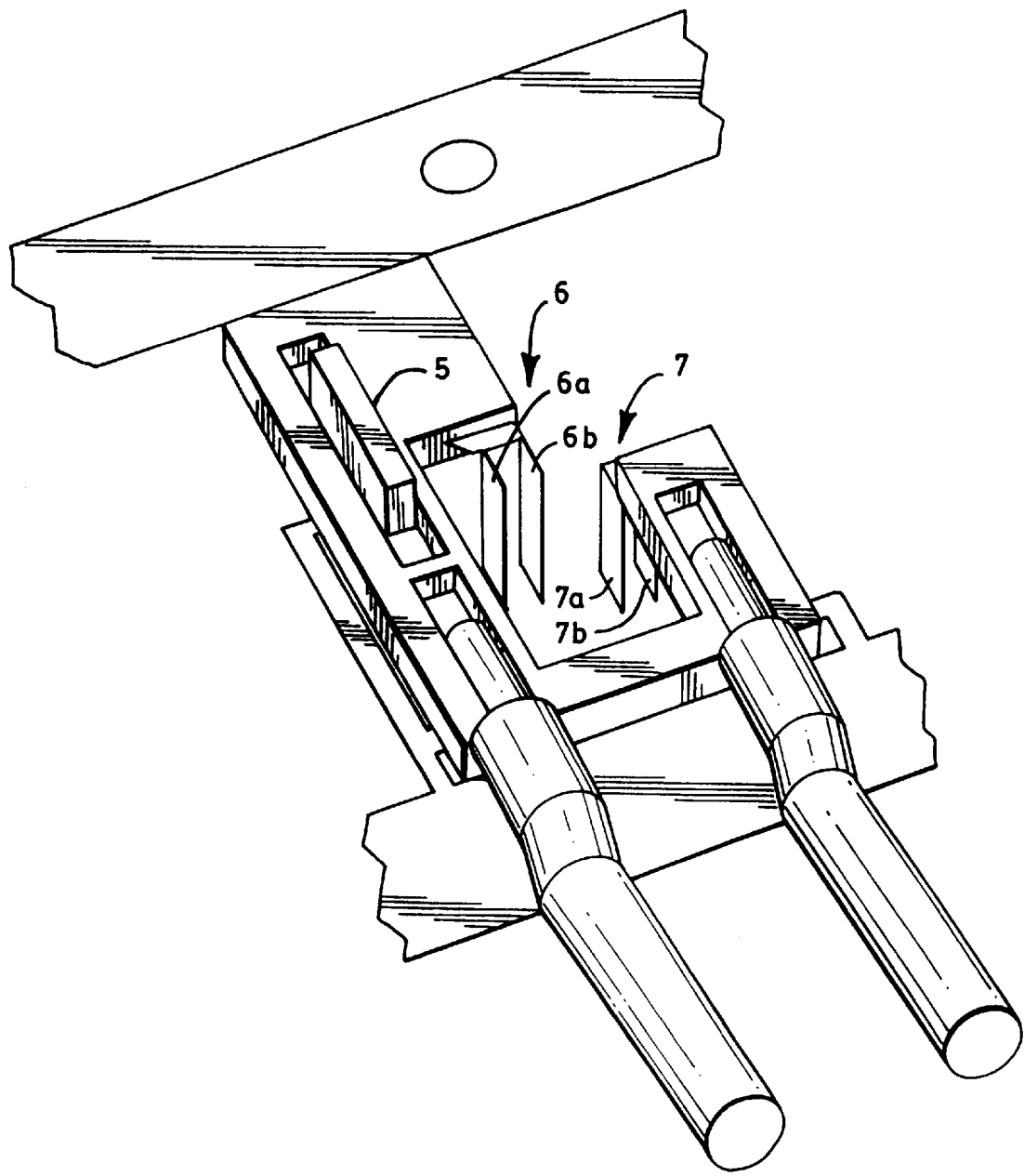
FIG. 6 is an enlarged view of the third step of the process of forming the plug.

Finally, the plug pins 6 and 7 are formed in a subsequent fourth manufacturing step shown in FIG. 6. These plug pins 6 and 7 are formed from the ends 6a, 6b and 7a, 7b of the respective poles 3 and 4, which are made fork-shaped for this purpose. The ends or prongs 6a, 6b and 7a, 7b of the fork are bent up along an extension of their inner edge, and they are then both bent out of the plane of the sheet metal, around a transverse axis. Both sets of ends 6a, 6b and 7a, 7b are bent out of the plane in the same direction, which in FIG. 6 is orientated downward. As a consequence of their position in which they surround each other in the blank, they assume the parallel position needed for the plug pins on bending out.

The current-carrying element is thus completed by a fully automatic manufacturing method, and it can be separated from the sheet metal strip by cutting holding webs 10 and can be plugged immediately into the correspondingly shaped housing 12 (FIG. 2).

Figure 7:
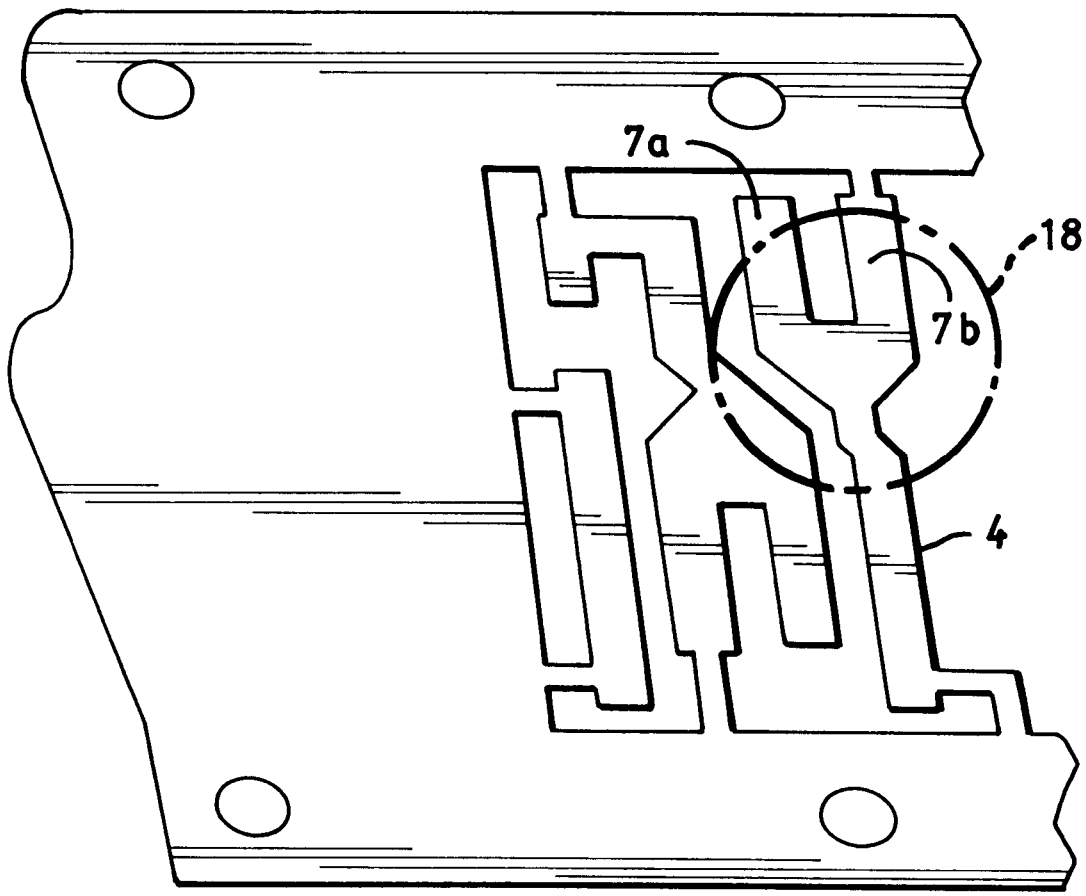
FIG. 7 is an enlarged view of the current paths connected to the forked ends by a T-shape.

The ends 6a, 6b and 7a, 7b can be connected to a remainder of their respective current paths 3, 4 by a Y-shape as shown in FIGS. 1 and 3–6, or by a T-shape as shown in FIG. 7 by reference numeral 18.

While specific embodiments of the invention have been shown and described in detail to illustrate the application of the principles of the invention, it will be understood that the invention may be embodied otherwise without departing from such principles.

What is claimed is:

1. A plug for an inflator of an air bag impact protection device, the plug comprising:

first and second current paths formed from a sheet metal strip, said first current path having a U-shape with an adjacent segment positioned adjacent said second current path and an opposite segment positioned on an opposite side of said U-shape from said second current path, said opposite segment including two poles defining an gap, said adjacent segment and said second current path forming plug pins;

a choke housing with a choke coil in said first current path and electrically bridged over said gap, said two poles forming a mechanical support for said choke coil.

2. A plug in accordance with claim 1, wherein:

ends of said first and second current paths are fork-shaped;

said plug pins are formed by bending up said ends of said first and second current paths.

3. A plug in accordance with claim 1, wherein:

said choke housing includes electric terminals directly connectable to said two poles.

4. A plug in accordance with claim 2, wherein:

said choke housing includes electric terminals directly connectable to said two poles.

5. A plug in accordance with claim 1, wherein:

a carrier surrounds said first and second current paths, and defines a slot for said choke housing, said plug pins lead outside said housing.

6. A plug in accordance with claim 1, wherein:

said ends of said first and second current paths are T-shaped;

said plug pins are formed by bending up said ends of said first and second current paths.

7. A plug in accordance with claim 2, wherein:

a housing surrounds said first and second current paths, and surrounds said choke housing, said plug pins lead outside said housing;

said forked shaped ends are directed in opposite directions;

each of said first and second current paths include an output end which exit from said housing in a same direction.

\* \* \* \* \*